(12) United States Patent
Embler

(10) Patent No.: US 8,060,136 B2
(45) Date of Patent: Nov. 15, 2011

(54) LIGHT ILLUMINATION COMPENSATION FOR MOBILE COMPUTING DEVICES

(75) Inventor: Gary L. Embler, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1006 days.

(21) Appl. No.: 11/891,061

(22) Filed: Aug. 8, 2007

(65) Prior Publication Data

US 2009/0042606 A1 Feb. 12, 2009

(51) Int. Cl.
*H04M 1/00* (2006.01)
(52) U.S. Cl. .................. 455/556.1; 455/550.1; 455/566; 345/173
(58) Field of Classification Search ............... 455/550.1, 455/556.1, 566; 345/204, 73, 77
See application file for complete search history.

(56) References Cited

U.S. PATENT DOCUMENTS

| | | | |
|---|---|---|---|
| 6,191,873 | B1 | 2/2001 | Mizoguchi et al. |
| 6,379,022 | B1 | 4/2002 | Amerson et al. |
| 6,567,170 | B2 | 5/2003 | Tandon et al. |
| 6,689,999 | B2 | 2/2004 | Haines et al. |
| 7,106,378 | B2 | 9/2006 | Kawakami |
| 2003/0057888 | A1 | 3/2003 | Archenhold et al. |
| 2004/0105264 | A1 | 6/2004 | Spero |
| 2004/0108982 | A1 | 6/2004 | Krohn |
| 2004/0161145 | A1 | 8/2004 | Embler |
| 2005/0057539 | A1* | 3/2005 | Ong .............................. 345/204 |
| 2006/0243740 | A1* | 11/2006 | Reynolds et al. ............... 222/52 |
| 2007/0001940 | A1* | 1/2007 | Jo ................................... 345/77 |
| 2007/0189629 | A1 | 8/2007 | Embler |
| 2007/0211013 | A1 | 9/2007 | Uehara et al. |
| 2008/0297488 | A1* | 12/2008 | Operowsky et al. .......... 345/173 |

OTHER PUBLICATIONS

NEC Display Solutions, MultiSync LCD 2180WG-LED-SV, Highlights, printed from internet address: http://www.necdisplay.com/Products/Product/?product=d61cea64-a46e-4095-85b6-ed62136d058e, on Nov. 7, 2007, 2 pages.
NEC Display Solutions, MultiSync LCD 2180WG-LED-SV, Product Specifications, printed from internet address: http://www.necdisplay.com/Products/Product/?product=d61cea64-a46e-4095-85b6-ed62136d058e, on Nov. 7, 2007, 2 pages.
NEC Display Solutions, MultiSync LCD 2180WG-LED-SV, Technologies, printed from internet address: http://www.necdisplay.com/Products/Product/?product=d61cea64-a46e-4095-85b6-ed62136d058e, on Nov. 7, 2007, 2 pages.
Charlie White, NEC Display Solutions, NEC's LED/LCD Monitor Breaks New Ground, printed from internet address: http://www.necdisplay.com/NewsAndMediaCenter/Award/?award=09c4ed4f-4634-40eb-821f-101ea2bda112, on Nov. 7, 2007, 5 pages.
Kato Hiroshi, Sugitani Chouei, Wide Gamut Display Using LED Backlight—Technical Developments and Actual Products, NEC Technical Journal vol. 1 No. 3/2006, 5 pages.
NEC Display Solutions, SpectraView™ LCD Series, Color calibration solution for 19"—21" high-performance NEC LCDs, printed from Internet address: http://www.necdisplay.com/cms/documents/ColorBrochures/SpectraView%2OLCD%20Brochure_0606.pdf, on Nov. 7, 2007, 4 pages.

* cited by examiner

*Primary Examiner* — Danh Le

(57) ABSTRACT

A mobile computing device includes a housing, a light source, a power circuit, and a processing circuit. The housing is configured to be carried by a user while in use. The power circuit is coupled to the light source. The processing circuit is configured to provide control signals to the power circuit to illuminate the light source. The processing circuit is configured to count the illuminations of the light source, to store usage data based on the counted illuminations, and to adjust the control signals based on the usage data.

15 Claims, 4 Drawing Sheets

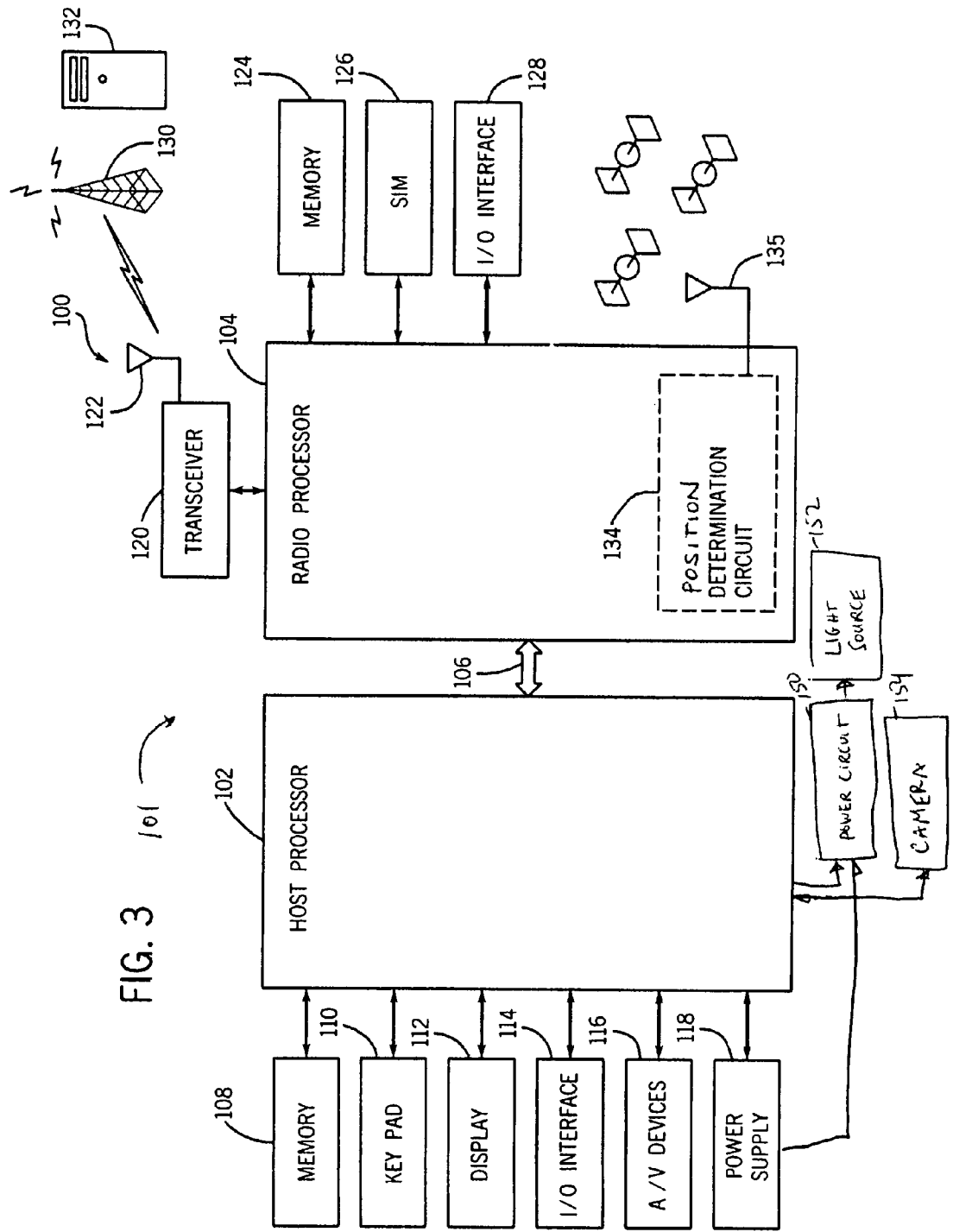

LIGHT ILLUMINATION COMPENSATION FOR MOBILE COMPUTING DEVICES

BACKGROUND

Light sources may be used on mobile computing device of many types. Light sources may be used for camera flash, flashlights, backlighting flat-screen displays and many other functions. The intensity of light sources may change with usage, whether usage over a lifetime of the light source, usage in the short-term, or other usage.

BRIEF DESCRIPTION OF THE DRAWINGS

FIG. 3 is a block diagram of the mobile computing device of FIGS. 1 and 2, according to an exemplary embodiment;

DETAILED DESCRIPTION OF EXEMPLARY EMBODIMENTS

Figure 1:
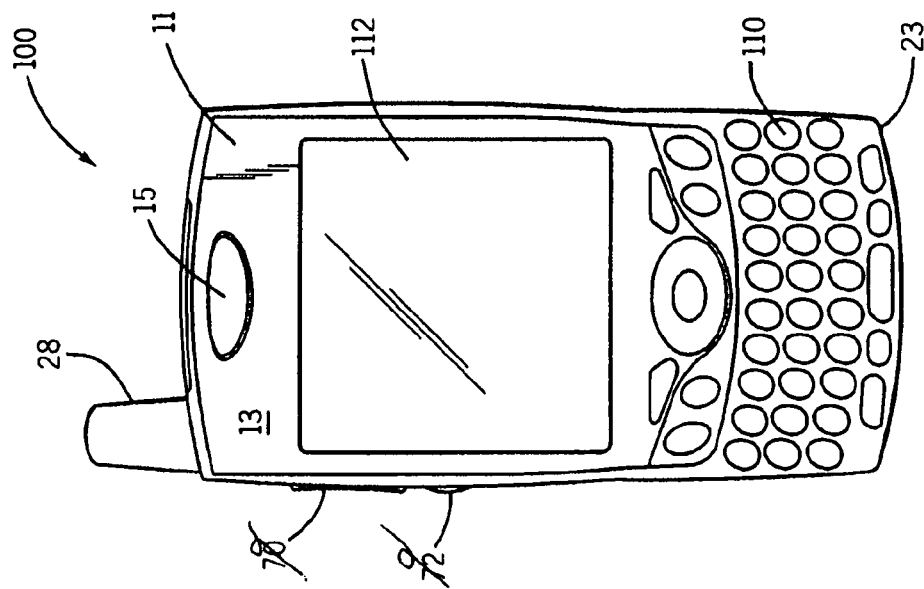
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer, digital camera, camera phone, personal navigation device, etc.) which may be configured to be carried by a user while in use or other electronic devices (e.g., a desktop personal computer, etc.). Personal digital assistant functionality can comprise one or more of personal information management functions (e.g., e-mail, calendar, contacts/address book, notes, bookmarks, favorites, etc.), database functions, word processing, spreadsheets, voice memo recording, etc. and may be configured to synchronize personal information from one or more applications with a computer (e.g., desktop, laptop, remote networked server, etc.). Device 100 may comprise a general purpose microprocessor which is further configured to receive and operate additional applications provided to device 100 after manufacture, e.g., via wired or wireless download, SecureDigital card, etc.

Figure 2:
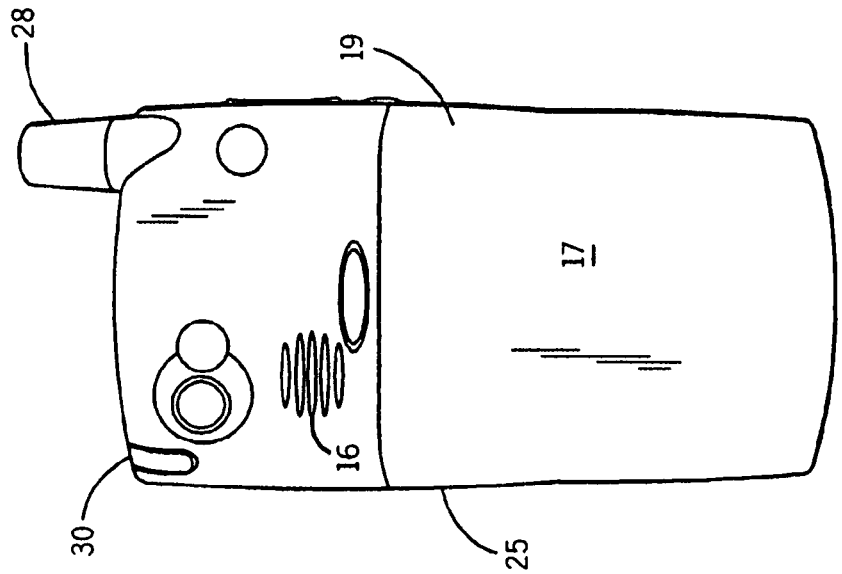
FIG. 2 is a back view of a mobile computing device, according to an exemplary embodiment.

Device 100 comprises a housing 11 having a front side 13 and a back side 17 (FIG. 2). An earpiece speaker 15, a loudspeaker 16, and a user input device (e.g., a plurality of keys) are coupled to housing 11. Housing 11 is configured to hold a screen in a fixed or slidable relationship above a user input device in a substantially parallel or same plane as the user input device. This fixed or slidable relationship excludes a hinged relationship between the screen and plurality of keys. Device 100 may be a handheld computer, which is a computer small enough to be carried in a typical front pocket found in a pair of pants, comprising such devices as typical mobile telephones, personal digital assistants, and some digital cameras, but excluding typical laptop computers, tablet PCs, and larger digital cameras. In alternative embodiments, display 112, user input device 110, earpiece 15 and loudspeaker 16 may each be positioned anywhere on front side 13, back side 17 or the edges therebetween.

In various embodiments device 100 has a width (shorter dimension) of no more than about 200 mm or no more than about 100 mm. According to some of these embodiments, housing 11 has a width of no more than about 85 mm or no more than about 65 mm. According to some embodiments, housing 11 has a width of at least about 30 mm or at least about 50 mm. According to some of these embodiments, housing 11 has a width of at least about 55 mm.

In some embodiments, housing 11 has a length (longer dimension) of no more than about 200 mm or no more than about 150 mm. According to some of these embodiments, housing 11 has a length of no more than about 135 mm or no more than about 125 mm. According to some embodiments, housing 11 has a length of at least about 70 mm or at least about 100 mm. According to some of these embodiments, housing 11 has a length of at least about 110 mm.

In some embodiments, housing 11 has a thickness (smallest dimension) of no more than about 150 mm or no more than about 50 mm. According to some of these embodiments, housing 11 has a thickness of no more than about 30 mm or no more than about 25 mm. According to some embodiments, housing 11 has a thickness of at least about 10 mm or at least about 15 mm. According to some of these embodiments, housing 11 has a thickness of at least about 50 mm.

In some embodiments, housing 11 has a volume of up to about 2500 cubic centimeters and/or up to about 1500 cubic centimeters. In some of these embodiments, housing 11 has a volume of up to about 1000 cubic centimeters and/or up to about 600 cubic centimeters.

While described with regards to a hand-held device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth system operating in accordance with the Bluetooth Special Interest Group (SIG) series of protocols.

As shown in the embodiment of FIG. 3, device 100 may comprise a processing circuit 101 which may comprise a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise additional processors, may be implemented as a dual- or multi-core chip with both host processor 102 and radio processor 104 on a single chip, etc. Alternatively, processing circuit 101 may comprise any digital and/or analog circuit elements, comprising discrete and/or solid state components, suitable for use with the embodiments disclosed herein.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102 and a memory 124 coupled to radio processor 104. In various embodiments, the memory 108, 124 may be configured to store one or more software programs to be executed by the host processor 102 or radio processor 104. Memory 108, 124 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although memory 108, 124 may be shown as being separate from the host processor 102 and radio processor 104 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an expansion slot to support a multimedia and/or memory card, for example.

Device 100 may comprise a user input device 110 coupled to the host processor 102. The user input device 110 may comprise, for example, a QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102 and a I/O interface 128 coupled to the radio processor. I/O interfaces 114, 128 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

Device 100 may comprise a transceiver 120 coupled to the radio processor 104. The transceiver 120 may comprise one or more transceivers configured to communicate using different types of protocols, communication ranges, operating power requirements, RF sub-bands, information types (e.g., voice or data), use scenarios, applications, and so forth.

The transceiver 120 may be implemented using one or more chips as desired for a given implementation. Although the transceiver 120 may be shown as being separate from and external to the radio processor 104 for purposes of illustration, in various embodiments some portion or the entire transceiver 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver 120. The antenna system 122 may comprise or be implemented as one or more internal antennas and/or external antennas.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

In various embodiments, device 100 may comprise location or position determination capabilities. Device 100 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to receive location data and associate the location data with a digital image captured by device 100 or for use with other applications, such as navigation applications. Device 100 may comprise a local position determination circuit 134 (e.g., a GPS receiver) which may be integrated within housing 11 (FIG. 1) configured to receive satellite data via an antenna 135 and to calculate a position fix. Local position determination circuit may alternatively comprise a GPS receiver in a second housing separate from housing 11 but in the vicinity of device 100 and configured to communicate with device 100 wirelessly (e.g., via a PAN, such as Bluetooth). Device 100 may be configured to communicate over a radio access network 130 (e.g., UMTS radio access network) with a remote computer 132 (e.g., a location determination entity (PDE), a location proxy server (LPS) and/or a mobile positioning center (MPC), etc.).

When assisting the mobile computing device 100, the remote computer 132 may handle various processing operations and also may provide information to aid location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Figure 4:
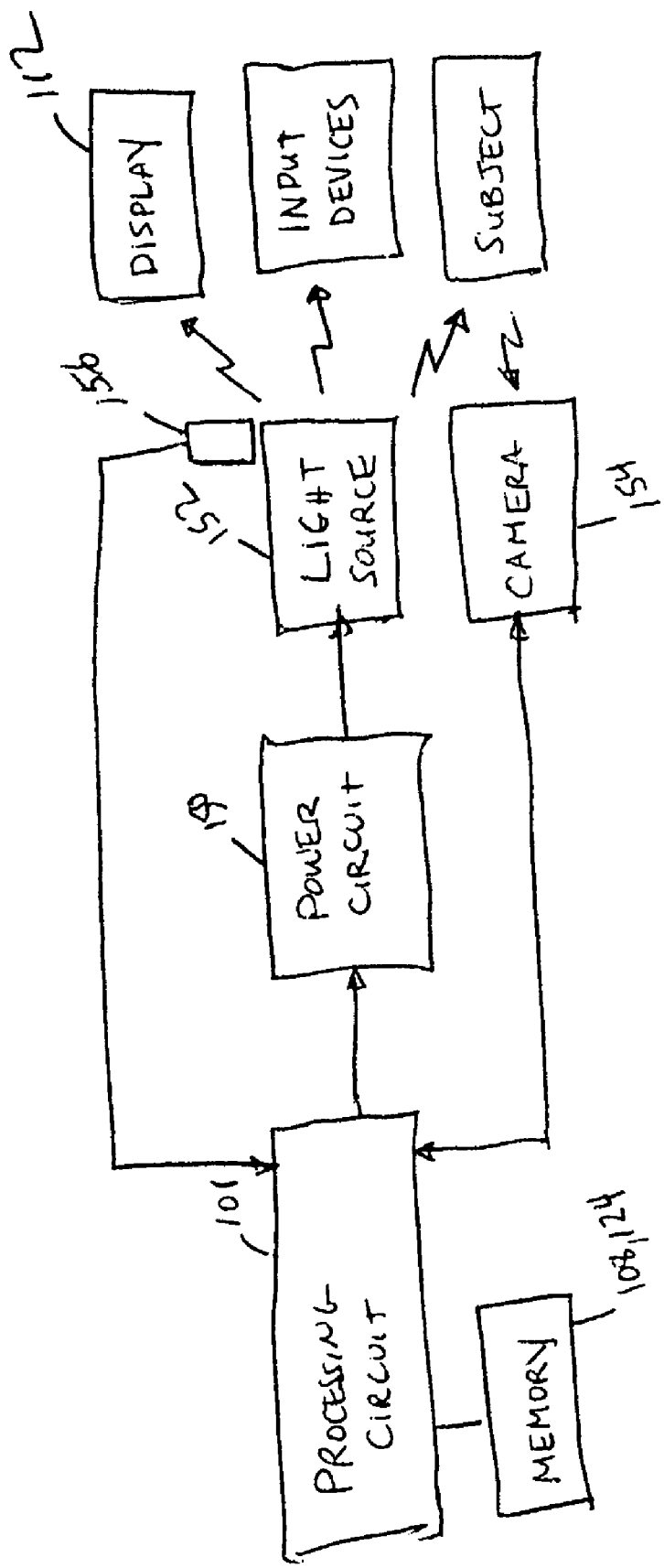
FIG. 4 is a block diagram of a system for light intensity compensation for a mobile computing device, according to an exemplary embodiment.

Referring now to FIG. 4, a system for light illumination compensation will be described. In this embodiment, processing circuit 101 is coupled to a power circuit 150 which is coupled to a light source 152. Power circuit 150 may be configured to receive a control signal from processing circuit 101 and power from power supply 118. A camera 154 may be coupled to processing circuit 101. Light source 152 may comprise a light emitting diode (e.g., a white phosphor light emitting diode, different-colored light emitting diodes such as red, blue, green, etc.) a xenon flash source, an incandescent source, or other light source. Power circuit 150 may comprises one or more circuit components (e.g., transistors, resistors, capacitors, switches, etc.) configured to provide power to the light source based on control signals received from processing circuit 101. Power circuit 150 may comprise one control or output line for a plurality of light sources, or may provide a plurality of control or output lines for each of the plurality of light sources to provide independent control of each light source. The control signals may be digital or analog signals, and may comprise a pulse-width modulated signal, a phase-modulated signal, a pulse-amplitude modulated signal, an on/off signal, or any other type of control signal.

Processing circuit 101 is configured to store usage data representing usage of the light source and to adjust the control signals based on the usage data. Usage data may comprise a quantity of usage over a lifetime of the light source (e.g., aging) which may be monitored by processing circuit 101. Usage data may comprise short-term usage of the light source, represented by a temperature of the light source. Short-term usage refers to the amount of usage of light source 152 in a period of time beginning when the light source temperature is raised above ambient temperature and ending when the light source temperature returns to ambient temperature. The temperature of the light source may be measured by a temperature sensor 156 (or one temperature sensor for each of the plurality of different-colored LEDs). Instead of or in addition to measuring the temperature of the light source, processing circuit 101 may be configured to estimate the temperature of the light source based on usage parameters of the device, such as number of flashes, duration of flashes, duration of continuous light, timing of flashes, intensity or power level of flashes, etc.). Usage data for light source 152 may be obtained in other ways.

Aging is a total accumulation of usage over a lifetime of an LED resulting in a reduction in intensity. Short term usage is a thermal characteristic of an LED resulting in a reduction in intensity as temperature rises.

Processing circuit 101 may be configured to store usage data, statistics, or coefficients in memory 108, 124. Usage data may comprise one or more values, numbers, or parameters indicating one or more characteristics of the usage of light source 152. For example, processing circuit 101 may be configured to count, track or monitor a number of illuminations of light source 152 and to store that number as usage data. The usage data may comprise data based on a quantity of illuminations over a lifetime of the light source. The usage data may also or alternatively comprise data based on a quantity of illuminations over a short predetermined period of time, such as less than 1 day, less than 1 hour, or less than 15 minutes. Short term usage data can provide an indication of the estimated temperature of the light source. Short term usage data may be augmented or combined with actual sensed temperature data from temperature sensor 156 disposed in close proximity to or attached to light source 152. In an alternative embodiment, sensed temperature from sensor 156 may be used to generate usage data instead of estimating temperature based on counted illuminations, representing a closed loop control system as opposed to the open loop control system of counting illuminations.

The usage data may be data which is determined in part based on a counted number of illuminations of light source 152 and in part based on other data. For example, the usage data may also be calculated based on a measured temperature. As another example, the usage data may be calculated based on a quantity of power provided to light source 152 (which may be estimated based on the control signals sent by processing circuit 101 to power circuit 150 or may be measured). The quantity of power may be for a lifetime of the light source, or otherwise a running total of power provided to light source 152. As another example, a time of illumination may be stored representing a total time light source 152 has been illuminated over its lifetime, representing a number of illuminations times a duration of each illumination. As another example, the usage data may be stored or calculated based on number of flashes, intensity or power of each flash, types of flash (e.g., red-eye reduction flicker, standard flash, etc.), duration of illumination (e.g., flash or continuous for video camera functionality), number of flashes within a predetermined time period (i.e. short-term flash rate), etc.

The usage data may be stored as a single variable or multiple variables. For example, each of lifetime usage and short-term usage may be represented as a number of illuminations, total duration of illuminations, total power provided to each light source, number of each type of flash (e.g., red-eye reduction flicker, standard flash, user-selected intensity of flash, etc.), or any other types of variables, constants, or values. For example, mobile computing device 100 may be configured to allow user-control of flash intensity, on/off control of red-eye mode (e.g., flash one or more times to provoke the iris to close in the subject). Processing circuit 101 may be configured to compensate for the temperature rise caused by the red-eye flashes and adjust the actual flash following the red-eye flashes. In one embodiment, compensation data may be stored which is based on the usage data, and which represents coefficients for corrections based on characterization data, which may comprise usage data, initial calibration data, and/or other data.

Processing circuit 101 may be configured to generate, correct and/or adjust control signals based on the usage data (e.g., to compensate for changes in light intensity). For example, a look-up table, linear or non-linear function, proportional relationship, or other function or relationship may be defined in a memory of processing circuit 101. An algorithm which models the characteristics of each LED may be stored in memory and used for control signal adjustment, which may be created based on empirical data or data from the specifications of the LEDs. Each LED may have a different current characteristic and voltage drop. Processing circuit 101 may be configured to generate control signals for light source 152 by selecting a desired illumination intensity for a particular illumination operation (e.g., flash, backlight, etc.), modifying or adjusting the desired illumination intensity based on the usage data as defined by the function or relationship, and providing the modified or adjusted control signals to power circuit 150.

Light source 152 may comprise a plurality of different-colored light emitting diodes configured to emit substantially white light (e.g., red, green, and blue, or other combinations). Substantially white light can be daylight color, fluorescent color, incandescent color, etc. Power circuit 150 may comprise a plurality of power output lines, each power output line coupled to a different one of the plurality of different-colored light emitting diodes. Processing circuit 101 may be configured to provide control signals which independently control the different light emitting diodes. In this embodiment, processing circuit 101 may be configured to control at least one or a plurality of the different light emitting diodes based on the usage data. For example, processing circuit 101 may be configured to determine a chromaticity shift (e.g., color shift, white point shift, white balance shift, color rendering shift, etc.) in light provided by the different light emitting diodes based on the usage data and to variably adjust or control at least one of the different light emitting diodes to correct or compensate for the chromaticity shift.

Chromaticity shift is a shift a white point of an illumination source. For example, where red, green and blue LEDs are used to produce white light, processing circuit 101 provides control signals to drive each LED with an intensity such that, when illuminations are combined, substantially white light is produced. Over the lifetime of the LEDs and with temperature change, the intensities of the LEDs change in response to the same control signal. The aging characteristics of the LEDs are different. Since the intensities of each LED change differently than the others, a chromaticity shift occurs.

Light source 152 may comprise non-LED light sources, such as an incandescent or xenon light source. In this embodiment, processing circuit 101 may be configured to variably adjust the control signals provided to the light source to adjust the intensity or overall light output of the light source based on the usage data.

According to one exemplary embodiment, light source 152 is configured to provide illumination to display 112, which may be a flat-screen display. In this embodiment, light source may comprise a white phosphor light emitting diode or a plurality of different-colored light emitting diodes configured to provide substantially white light. For example, display 112 may comprise color-matching or color compensation software and circuitry configured to optimize the display for color matching applications.

Processing circuit 101 may be configured to use usage data to ameliorate variability of LEDs or other light sources caused by long term or lifetime usage and/or short term usage relating to temperature increases.

Figure 5:
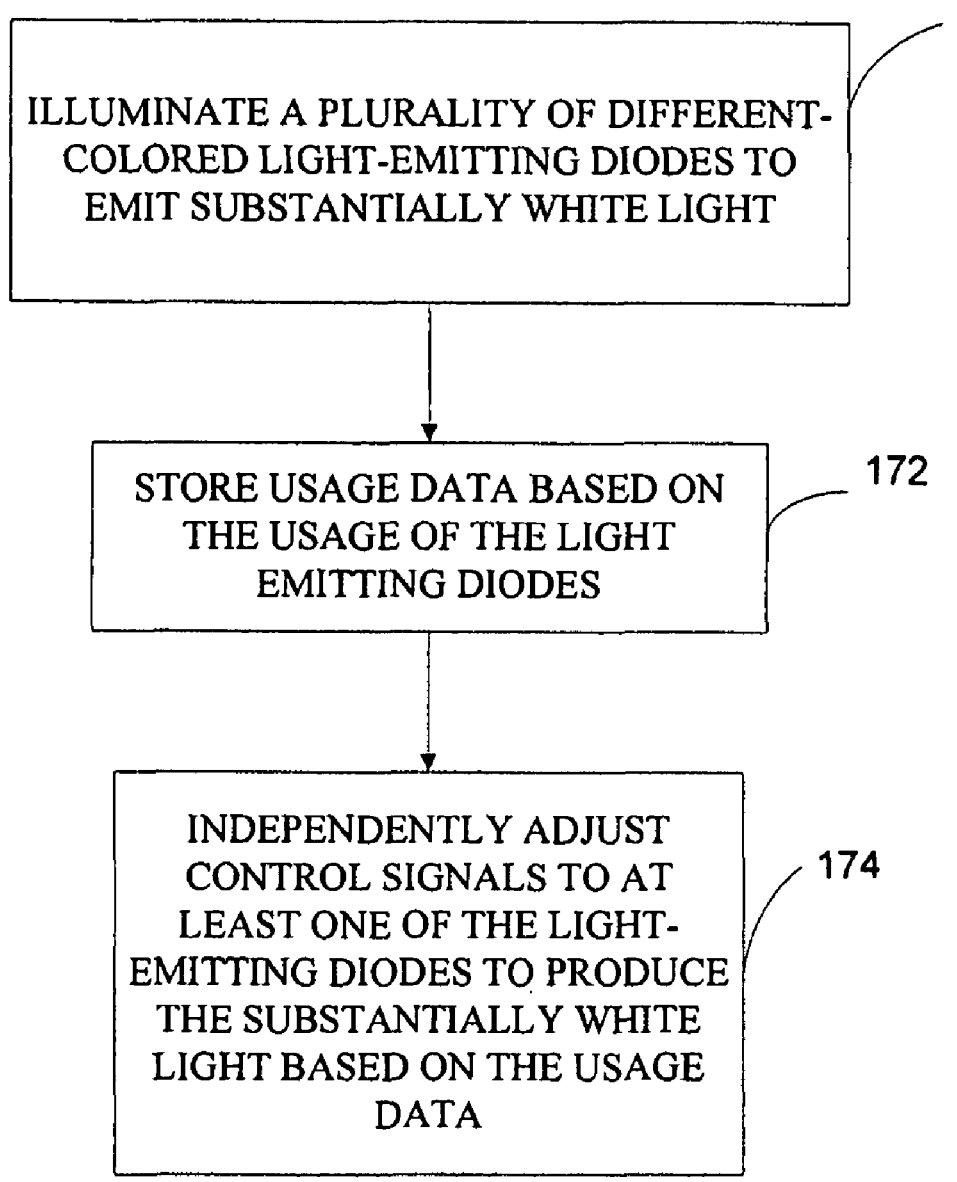
FIG. 5 is a flowchart illustrating a method for light intensity compensation for a mobile computing device, according to an exemplary embodiment.

Referring now to FIG. 5, an exemplary method of compensating for chromaticity shift in a light source will be described. At step 170, the method comprises generating control signals in a mobile computing device to illuminate a plurality of different-colored light-emitting diodes to emit substantially white light. Each of the light-emitting diodes may be controlled to provide light at independently-controllable intensities according to predetermined data known about the light-emitting diodes to produce substantially white light. At step 172, the method comprises storing usage data based on the usage of the light emitting diodes, using one or more of the methods described herein. At step 174, the method comprises independently adjusting the control signals to at least one of the light-emitting diodes to produce the substantially white light based on the usage data. For example, the method may comprise identifying that after a predetermined usage of a red LED, that the intensity of the red LED in response to a control signal has reduced due to usage. The method may comprise independently adjusting the control signal to the red LED to increase the intensity to cause the combination of the red LED with green and blue LEDs to emit substantially whiter light than was emitted before the adjustment.

According to another exemplary embodiment, a digital camera phone may comprise a housing configured to be carried by a user while in use, a wireless telephone circuit configured for telephone communication, a digital camera, a light source, a power circuit coupled to the light source, and a processing circuit configured to provide control signals to the power circuit to illuminate the light source and to variably adjust the intensity of the light source. For example, the intensity may be varied to increase based on a user input indicating a user-desired intensity level for a camera flash. The processing circuit may be configured to store usage data representing usage of the light source and to variably adjust the control signals based on the usage data. The processing circuit may be configured to count the illuminations of the light source and to store the usage data based on the counted illuminations of the light source.

According to one alternative embodiment, processing circuit 101 may be configured to process a captured image from camera 154 based on the usage data. This step may occur instead of or in addition to adjusting control signals to light source 152 based on the usage data. Once an image is captured and converted to a digital image file, processing circuit 101 may be configured to adjust the color of one or more pixels of the digital image file based on known usage data about the light source at the time it was used to capture the image. The processing may further be done based on a detected quality or "whiteness" of ambient light on the subject during the image capture. For example, if the light source was hot due to a number of illuminations occurring in a short period of time, processing circuit 101 may be configured to determine the chromaticity shift of light source 152 based on temperatures of one or more of the LEDs used to create substantially white light, and to adjust the color of the captured image based on the determination of chromaticity shift.

According to yet another alternative embodiment, usage data may be stored along with a digital image file (e.g., in EXIF data or other metadata) indicative of usage of the LEDs at the time the image was captured. This usage data may be used during subsequent processing of the image file by a computer separate from processing circuit 101 (e.g., a desktop personal computer, laptop computer, server computer, etc.). The usage data may comprise the lifetime usage data (e.g., total operating time) and short term operation time (e.g., how many flashes have occurred in a predetermined amount of time), the measured temperature of the LEDs at the time of the illumination and image capture. Also, other data may be stored, such as factory calibration data for the LEDs, etc.

According to one exemplary embodiment, an initial calibration of LEDs on a mobile computing device may be done during manufacturing or at a point of sale. Light from light source 152 can be generated using this calibration data to create substantially white light. Usage data can then be generated and stored separately or combined with the calibration data to create the usage data used by processing circuit 101 in subsequent light-generating operations.

According to one exemplary embodiment, processing circuit 101 is configured to count the number of flashes taken when mobile computing device 100 comprises a digital camera. After a predetermined number of pictures taken with flash (e.g., comprising a plurality of different-colored LEDs to provide substantially white light) within a predetermined period of time, processing circuit 101 is configured to determine that one or more of the LEDs is increasing in temperature. Processing circuit 101 then computes the next control signal based on an adjustment factor based on the usage data to alleviate color shift. After the user turns device 100 off and later (providing sufficient time for device 100 to cool) resumes taking pictures, processing circuit 101 may be configured to determine how far along an aging curve (e.g., plotting lifetime usage versus illumination variance, stored in memory 108, 124) each LED is, and to provide further adjustment or correction favor based on the lifetime aging.

A backlight LED may have a flat, narrow LED suitable for continuous illumination. A flash LED may be designed for high pulse currents and have a beam spread angle of about 60 degrees, or more or less than 60 degrees in various applications.

With reference to the disclosure and claims, use of the phrase "based on" means "based in least in part on," and use of the term "a" or "an" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the FIGs., and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device, comprising:
   a housing;
   a light source, at least partially contained within the housing;
   a power circuit coupled to the light source; and
   a processing circuit configured to provide control signals to the power circuit to illuminate the light source, wherein the processing circuit is configured to (i) count the illuminations of the light source, (ii) store usage data based on the counted illuminations, and (iii) adjust the control signals based on the usage data and on a particular illumination operation.

2. The mobile computing device of claim 1, wherein the light source comprises a light emitting diode.

3. The mobile computing device of claim 2, wherein the light source comprises a plurality of different-colored light emitting diodes configured to emit substantially white light.

4. The mobile computing device of claim 3, wherein the power circuit comprises a plurality of power output lines, each power output line coupled to a different one of the plurality of different-colored light emitting diodes, wherein the processing circuit is configured to provide control signals which independently control the different light emitting diodes, wherein at least one of the different light emitting diodes is controlled based on the usage data.

5. The mobile computing device of claim 4, wherein the processing circuit is configured to determine a chromaticity shift in light provided by the different light emitting diodes based on the usage data and to control the different light emitting diodes to correct for the chromaticity shift.

6. The mobile computing device of claim 1, wherein the usage data is based on a quantity of illuminations over a lifetime of the light source.

7. The mobile computing device of claim 1, wherein the usage data is based on a quantity of illuminations over a predetermined period of time less than 1 hour.

8. The mobile computing device of claim 1, further comprising a digital camera configured to capture an image.

9. The mobile computing device of claim 8, wherein the light source is configured to provide a flash.

10. The mobile computing device of claim 8, wherein the light source is configured to provide a continuous illumination.

11. The mobile computing device of claim 1, further comprising a flat-screen display, wherein the light source is configured to illuminate the flat-screen display.

12. The mobile computing device of claim 1, wherein the light source comprises a white phosphor light emitting diode.

13. The mobile computing device of claim 1, wherein the mobile computing device comprises a display fixed in a coplanar or parallel plane with a plurality of input devices.

14. The mobile computing device of claim 1, further comprising a wireless telephone.

15. The mobile computing device of claim 1, wherein the processing circuit is configured to operate a plurality of personal information management applications and to synchronize the personal information management applications with a remote computer.

* * * * *